United States Patent [19]
Zaccheo

[11] Patent Number: 5,291,682
[45] Date of Patent: Mar. 8, 1994

[54] SPECIES SELECTIVE FISHING NET SYSTEM

[76] Inventor: Nicole L. Zaccheo, 793 Uniontown Rd., Phillipsburg, N.J. 08865

[21] Appl. No.: 767,382

[22] Filed: Sep. 30, 1991

[51] Int. Cl.$^5$ ............................................ A01K 79/02
[52] U.S. Cl. ........................................ 43/17.1; 43/9.2; 367/139
[58] Field of Search .................... 43/17.1, 9.2, 6.5; 367/139, 142; 340/384 E, 384 R; 116/22 A

[56] References Cited

U.S. PATENT DOCUMENTS

| | | | |
|---|---|---|---|
| 3,524,276 | 8/1970 | Thomas et al. | 43/17.1 |
| 3,886,492 | 5/1975 | White | 367/139 |
| 4,105,992 | 8/1978 | Luciano | 367/139 |
| 4,356,654 | 11/1982 | Trekel et al. | |
| 4,501,084 | 2/1985 | Mori | |
| 4,563,759 | 1/1986 | Hayakawa | 367/139 |
| 4,805,335 | 2/1989 | West et al. | |
| 4,955,005 | 9/1990 | Loeffelman | 367/139 |
| 5,046,278 | 9/1991 | Szilagyi et al. | 43/17.1 |
| 5,117,572 | 6/1992 | Parra | 43/9.2 |
| 5,134,592 | 7/1992 | Parra | 43/17.1 |

Primary Examiner—Kurt C. Rowan
Assistant Examiner—Chuck Y. Mah
Attorney, Agent, or Firm—Kenneth P. Glynn

[57] ABSTRACT

The invention is a fishing net system which is selective for catching one or more species and for excluding one or more species. It includes a fishing net having webbing of adequate size to catch one or more desired species a sound transmitting unit and one or more underwater speakers. The sound transmitting unit is at a remote location, e.g. on a boat, and the speakers are located, within close proximity to the fishing net. The speakers emit sounds which offend one or more species and frighten them away from the net without offending other species.

7 Claims, 2 Drawing Sheets

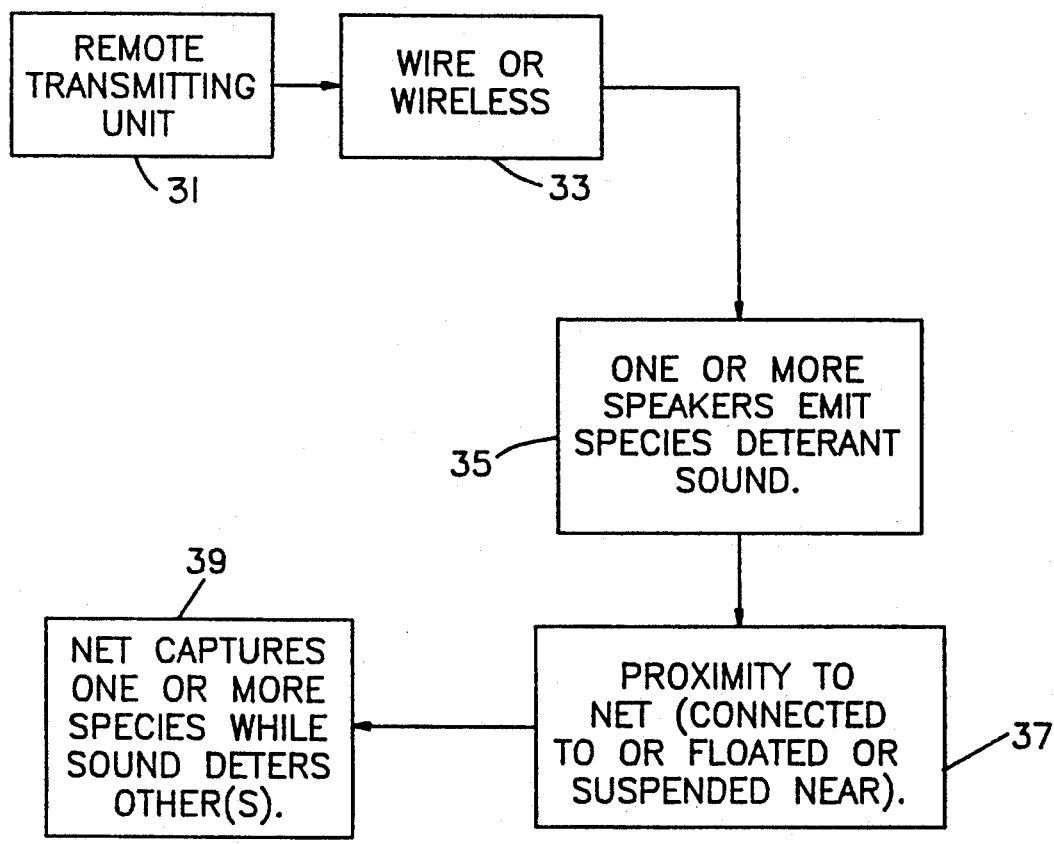

SPECIES SELECTIVE FISHING NET SYSTEM

BACKGROUND OF THE INVENTION

1. Field of the Invention

The present invention is directed to a novel fishing net system and more specifically to a combination conventional fishing net and a means for selective species capture, by exclusion or inclusion of desired species. The means utilized is species selective sonic deterrent means.

2. Prior Art Statement

Fishing net systems have been around for centuries and are even referenced in the Bible. Until recently, commercial fishing had not changed very much and is an important industry for nearly all nations. Recent developments have included net redesign to maximize the catch and some netting arrangements have been made to selectively include or exclude certain species.

U.S. Pat. No. 4,356,654, to Trekel, et al, describes tandem dragnets to overcome physical load problems of conventional nets and briefly describes other prior art patents therein.

U.S. Pat. No. 4,501,084 describes a fishing net with photoconductive cables to create a plurality of fiber optics light sources which influence fish by attaching them into a net and then by discouraging them from exiting the net.

U.S. Pat. No. 4,805,335, issued to West, et al, covers a sorting device for trawl nets which utilizes a particular net arrangement with a funnel to frighten finfish away but to sort shellfish therethrough.

Notwithstanding the prior art, none teach or suggest the use of sonic deterrents to selectively exclude one or more species away from a fishing net, as in the present invention.

SUMMARY OF THE INVENTION

The invention is a fishing net system which is selective for catching one or more species and for excluding one or more species. It includes a fishing net having webbing of adequate size to catch one or more desired species a sound transmitting unit and one or more underwater speakers. The sound transmitting unit is at a remote location, e.g. on a boat, and the speakers are located within close proximity to the fishing net. The speakers emit sounds which offend one or more species and frighten them away from the net without offending other species.

BRIEF DESCRIPTION OF THE DRAWINGS

The present invention is more fully understood when the specification is taken in conjunction with the drawings appended hereto, wherein:

FIG. 2 shows a schematic diagram of a present invention embodiment.

DETAILED DESCRIPTION OF THE PRESENT INVENTION

Figure 1:
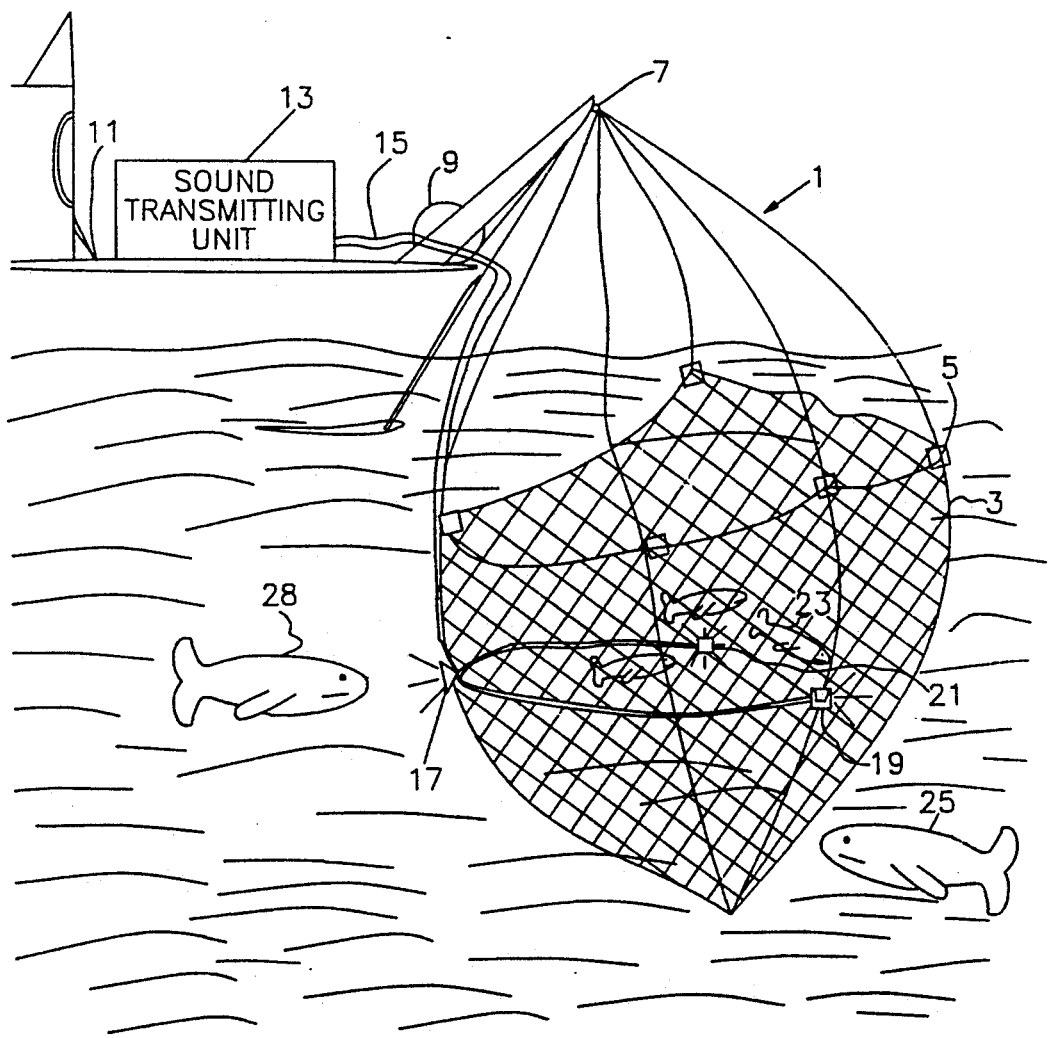
FIG. 1 shows a present invention system in place.

The present invention is a novel fishing net system. The primary object of the invention is to provide a fishing net system which enables the user to capture one or more selected species of fish while excluding one or more species, by utilizing species selective sonic deterrent means.

Throughout the fishing industry it is common to capture undesired species along with large quantities of the desired species of fish. This had resulted in the unnecessary harm to species such as dolphins and porpoises. In fishing industries when dolphins and porpoises have been victimized there has been enough public pressure to compel the industry to make costly modifications to minimize this harm.

It is the object of the present invention to provide a fishing net system which will enable fishermen to catch various species of fish with out victimizing or harming dolphins or porpoises. For example, in the tuna industry there has been great concern about harm to dolphins and very complex and expensive netting configurations have been proposed. However, such changes in basic net design can create expense to the point where the industry cannot be competitive with the fishing industries of other nations.

Thus, it is another object of the present invention to crate a netting system which is compatible with and retrofittable with existing, typical net configurations.

Referring now to FIG. 1 there is shown a present invention fishing net system 1 having a commercial net 3 (in this case, for tuna) having floats such as float 5 and attached to reel 9 on ship 11 by hoist 7. Net 3 captures fish such as tuna 23. Ship 11 includes sound transmitting unit 13 which is connected by cable 15 to net 3 and cable 15 is wired to underwater speakers 17, 19, and 21. While in this embodiment the wiring and speakers are attached directly to net 3, they could alternatively, be suspended by floats and suspension wires in proximity to and surrounding the net or groups of nets.

Sound transmitting unit 13 sends sound signals through speakers 17, 19 and 21 which scare or deter dolphins 25 and porpoises 28 away from net 3. In one embodiment, this sound may be loud, repetitive mechanical noises but is preferably the playing of a recording of the call of an enemy of dolphins and/or porpoises, especially such as the call of the killer whale.

Referring now to FIG. 2 there is shown a schematic diagram wherein remote transmitting unit 31 sends species selective deterrent sounds to one or more speakers 35 either by wire or wireless 33. For example, underwater audio cables may be used or radio transmission may be used. The speakers 35 are located in proximity to net 37 whereby the net captures one or more species 39 and deters other(s).

In one preferred embodiment, the speakers may be separately suspended by boats or buoys and have radio receiver capabilities. They will be placed strategically around one or more nets to deter the undesirable species away from a preselected fishing area.

Obviously, numerous modifications and variations of the present invention are possible in light of the above teachings. It is therefore understood that within the scope of the appended claims, the invention may be practiced otherwise than as specifically described herein.

What is claimed is:

1. A fishing net system which is selective for catching one or more species and for excluding one or more species, which comprises:

(a) a fishing net having a webbing of adequate size to catch one or more desired species;

(b) a sound transmitting unit located at a remote location from said fishing net and having sound generating capability with sound which selectively deters one or more undesired species of fish away from the sound;

(c) one or more underwater speakers attached to said fishing net and being capable of receiving and broadcasting sound from said remote sound transmitting unit at a level adequate to deter one or more species away from said fishing net.

2. The system of claim 1 wherein said sound transmitting unit is a wireless transmitter and said speakers include wireless receivers with amplifiers.

3. The system of claim 1 wherein said sound transmitting unit and said one or more speakers are connected by sound transmission wires.

4. The system of claim 1 wherein said one or more desired species is tuna.

5. The system of claim 4 wherein said one or more undesired species is selected from dolphins, porpoises and both of these.

6. The system of claim 1 wherein said one or more undesired species is selected from dolphins, porpoises and both of these.

7. The system of claim 6 wherein said sound is the sound of one or more whales.

* * * * *